United States Patent [19]

Halloran

[11] Patent Number: 5,707,435
[45] Date of Patent: Jan. 13, 1998

[54] AMMONIUM SILOXANE EMULSIONS AND THEIR USE AS FIBER TREATMENT AGENTS

[75] Inventor: Daniel Joseph Halloran, Midland, Mich.

[73] Assignee: Dow Corning Corporation, Midland, Mich.

[21] Appl. No.: 730,983

[22] Filed: Oct. 16, 1996

[51] Int. Cl.[6] ............................................. C09D 5/00
[52] U.S. Cl. ............................ 106/287.11; 252/8.63; 423/387
[58] Field of Search .................. 106/287.11; 252/8.63; 423/387

[56] References Cited

U.S. PATENT DOCUMENTS

| | | | |
|---|---|---|---|
| 2,891,920 | 6/1959 | Hyde et al. | 260/29.2 |
| 2,947,771 | 8/1960 | Bailey | 260/448.2 |
| 3,294,725 | 12/1966 | Findlay et al. | 260/29.2 |
| 3,355,424 | 11/1967 | Brown | 260/46.5 |
| 3,433,780 | 3/1969 | Cekada et al. | 260/29.2 |
| 3,544,498 | 12/1970 | Holdstock et al. | 260/29.2 |
| 3,576,779 | 4/1971 | Holdstock et al. | 260/29.2 |
| 3,890,269 | 6/1975 | Martin | 260/46.5 |
| 4,472,566 | 9/1984 | Ziemelis | 528/38 |
| 4,597,964 | 7/1986 | Ziemelis et al. | 424/70 |
| 4,602,959 | 7/1986 | Kurita et al. | 106/287.11 |
| 4,620,878 | 11/1986 | Gee | 106/287.15 |
| 4,631,207 | 12/1986 | Price | 106/287.11 |
| 4,680,366 | 7/1987 | Tanaka et al. | 106/287.11 |
| 4,891,166 | 1/1990 | Schaefer et al. | 260/404.5 |
| 4,895,964 | 1/1990 | Margida | 556/425 |
| 4,973,620 | 11/1990 | Ona et al. | 106/287.11 |
| 4,999,398 | 3/1991 | Graiver et al. | 524/837 |
| 5,026,489 | 6/1991 | Snow et al. | 252/8.8 |
| 5,041,590 | 8/1991 | Snow | 556/425 |
| 5,087,715 | 2/1992 | Snow | 556/413 |
| 5,098,979 | 3/1992 | O'Lenick, Jr. | 528/15 |
| 5,104,576 | 4/1992 | Snow | 252/357 |
| 5,110,891 | 5/1992 | Cifuentes et al. | 528/34 |
| 5,115,049 | 5/1992 | Imperante et al. | 525/479 |
| 5,235,082 | 8/1993 | Hill et al. | 556/425 |
| 5,364,633 | 11/1994 | Hill et al. | 424/450 |
| 5,403,886 | 4/1995 | Chrobaczek et al. | 106/287.11 |

*Primary Examiner*—David Brunsman
*Attorney, Agent, or Firm*—Timothy J. Troy

[57] ABSTRACT

The present invention relates to a silicone emulsion comprising (I) a water soluble ammonium siloxane composition comprising (A) an aminosiloxane solution comprising a mixture of (i) a triorganosilyl-endblocked aminofunctional siloxane, (ii) an aminofunctional siloxane which it triorganosiloxy-endblocked at one end and hydroxy-endblocked at the other end, and (iii) a hydroxy-endblocked aminofunctional siloxane, (B) a cyclic aminofunctional siloxane, and (C) a polydimethylcyclosiloxane where the aminofunctional group is selected from

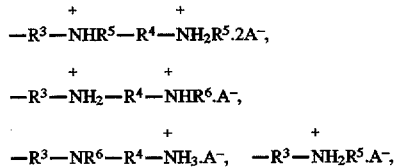

where $R^3$ is a divalent hydrocarbon radical, $R^4$ is a divalent hydrocarbon radical, $R^5$ is hydrogen, alkyl, aryl, or arylalkyl, $R^6$ is a $-C(O)R^7$ group where $R^7$ is a monovalent hydrocarbon group or aryl, and $A^-$ is a halide anion, carboxylate anion, or inorganic oxoanion, and (II) an organopolysiloxane emulsion. This invention further relates to a method of making the silicone emulsion, and to a method of treating a substrate with the silicone emulsion.

27 Claims, No Drawings

AMMONIUM SILOXANE EMULSIONS AND THEIR USE AS FIBER TREATMENT AGENTS

BACKGROUND OF THE INVENTION

The present invention relates to ammonium siloxane emulsions. More particularly, the present invention relates to emulsions containing water soluble ammonium siloxanes, a method of making ammonium siloxane emulsions, and the use of these emulsions as fiber treatment agents.

Quaternary ammonium polydiorganosiloxanes which are cationic and water soluble have been disclosed. For example, Schaefer et al. in U.S. Pat. No. 4,891,166 discloses diquaternary polysiloxanes whose quaternary nitrogen groups are terminally linked to the polysiloxane molecule, and their use in cosmetic preparations, especially in preparations for the care of hair. Margida in U.S. Pat. No. 4,895,964 discloses a process for the manufacture of quaternary ammonium pendant siloxane copolymers by the reaction of epoxy pendant siloxane copolymers with a tertiary amine acid salt using a catalytic amount of a free tertiary amine as the catalyst. Snow in U.S. Pat. No. 5,041,590 discloses a quaternary ammonium functional siloxane compound having the formula $[(R_3SiO)_2—SiR—(CH_2)_a]_b N^+R'_{4-b}X^-$ where R is an alkyl radical having one to six carbon atoms, R' is an alkyl or aryl radical having one to eight carbon atoms, X is a chloride, bromide, iodide, nitrate, or $RSO_4^-$, a is an integer having a value from 1 to 10, and b is an integer having a value of 2 or 3. Snow further discloses that these siloxane compounds are useful in reducing the surface tension of an aqueous solution. Hill et al. in U.S. Pat. No. 5,235,082 discloses diquaternary ammonium functional siloxanes which have a variable amount of hydrophobicity at the center of the molecule which makes them useful in the field of fabric softening and fabric conditioning. Hill et al. in U.S. Pat. No. 5,364,633 discloses a method of entrapping a water-soluble substance in vesicles formed from a siloxane surfactant, where suitable siloxane surfactants include organosilicon compounds having the formula $RMe_2SiO(Me_2SiO)_a(MeRSiO)_bSiMe_2R$, $Me_3SiO(Me_2SiO)_a(MeRSiO)_bSiMe_3$, or $Me_3SiO(MeRSiO)SiMe_3$ where R can be a $—(CH_2)_xN^+R_3"A^-$, R" is an alkyl radical having from 1 to 6 carbon atoms, a benzyl radical, a phenyl radical, or the radical $—CH_2CH_2OH$, $A^-$ is chloride, bromide, iodide, cyanide, a methyl sulfate radical, a salicylate radical, or a dodecylsulfate radical, a has a value of 0 to 200, and b has a value of 0 to 50 with the proviso that both a and b cannot both be zero. O'Lenick Jr. in U.S. Pat. No. 5,098,979 discloses silicone polymers which contain a quaternary nitrogen pendant group, where in one embodiment the quaternary nitrogen group has an alkylamido functionality and in a second embodiment it contains an imidazoline derived functionality. O'Lenick Jr. further discloses that these polymers are useful in softening hair, textile fibers, and conditioning skin.

In addition, other low molecular weight aminofunctional siloxanes are known to be water-soluble. For example, Snow in U.S. Pat. Nos. 5,087,715 and 5,104,576 discloses alkanolaminofunctional siloxanes which are useful in altering the surface activity of water, the siloxanes having the formula $R^1_3SiO(R^1MSiO)_ySiR^1_3$ or $R^1_3SiO(R^1_2SiO)_x(R^1MSiO)_y SiR^1_3$ where x is an integer from 1 to 100, y is an integer from 1 to 10, $R^1$ is a lower alkyl group, and M is an alkanolamino group having the formula $—(CH_2)_aN(R^2)—(CH_2)_bOR^3$ or $—(CH_2)_aN^+(R^2)(R^4)—(CH_2)_bOR^3Z^-$ where a is an integer from 1 to 10, b is an integer from 1 to 10, $R^2$ is hydrogen, a $C_1$ to $C_{18}$ alkyl group, a $C_6$ to $C_{18}$ aryl group, $—CH_2—C_6H_5$, or a $C_5$ to $C_{18}$ cycloalkyl group, $R^3$ is hydrogen, a $C_1$ to $C_{18}$ alkyl group, a $C_6$ to $C_{18}$ aryl group, a $C_5$ to $C_{18}$ cycloalkyl group, $—C(O)R^5$, $—C(O)NHR^6$, $—SO_3^-$, $—Si(CH_3)_3$, or $—P(O)(OCH_3)_2$, $R^4$ is hydrogen, a $C_1$ to $C_{18}$ alkyl group, a $C_6$ to $C_{18}$ aryl group, $—CH_2—C_6H_5$, or a $C_5$ to $C_{18}$ cycloalkyl group, $R^5$ and $R^6$ are a $C_1$ to $C_{18}$ alkyl group, a $C_6$ to $C_{18}$ aryl group, or a $C_5$ to $C_{18}$ cycloalkyl group, and Z is Cl, Br, I, $NO_3$, a $C_1$ to $C_8$ alkylsulfate group, $—CH_3COO^-$, $BF_4^-$ or $PF_6^-$. Snow et al. in U.S. Pat. No. 5,026,489 discloses a fabric softening composition which includes an alkanolamino functional silicone compound having the formula $(R_3SiO)_2SiR—(CHR')_aN^+R'_bR"_{3-b}X^-$ where R is an alkyl radical having one to six carbon atoms, R' is hydrogen, alkyl and aryl radicals having one to eighteen carbon atoms, R" is (CHR')OH, X is a chloride, bromide, iodide, nitrate, or $RSO_4^-$, a is an integer having a value from 1 to 10, and b is an integer having a value of 1 or 2.

Polymeric ammonium functional siloxanes have also been taught. For example, Ziemelis et al. in U.S. Pat. Nos. 4,472,566 and 4,597,964 discloses cationic polydiorganosiloxanes having the general formula $QMe_2SiO(Me_2SiO)_x(MeRSiO)_ySiMe_2Q$ where Me denotes methyl, and R is a radical having the formula $—C_mH_{2m}NHC_nH_{2n}N^+H_2CH_2C_6H_5Cl^-$ or $—C_mH_{2m}N^+(CH_2C_6H_5Cl^-)HC_nH_{2n}N^+H_2CH_2C_6H_5Cl^-$ where m has a value of 2 to 5 inclusive, and n has a value of 1 to 5 inclusive, Q is R, methyl, or OH, x has a value of 5 to 200, and y has a value of 1 to 30. Ziemelis et al. further discloses that these siloxanes are useful for treating human hair, human skin, and animal fur.

Reactive ammonium-functional siloxanes have also been disclosed in the art. For example, Brown in U.S. Pat. No. 3,355,424 discloses a process for the preparation of polyaminoalkyl-substituted organosiloxane copolymers and salts thereof, and to the reaction products of said processes. Holdstock et al. in U.S. Pat. Nos. 3,544,498 and 3,576,779 discloses an organopolysiloxane copolymer which is prepared by the partial hydrolysis and condensation of a silanol-chainstopped polydimethylsiloxane having 5 siloxy units, an aminoalkyltrialkoxysilane, and an aminoalkoxyalkyltrialkoxysilane. Holdstock et al. further teaches that a second organopolysiloxane copolymer can be prepared by the partial hydrolysis and condensation of a silanol-chainstopped polydimethylsiloxane having 800 dimethylsiloxy units with an aminoalkoxyalkenyltrialkoxysilane. Holdstock et al. further teaches that the first organopolysiloxane polymer can be converted to a partial amine salt by reaction with an aliphatic carboxylic acid, then mixed with the second organopolysiloxane. Martin in U.S. Pat. No. 3,890,269 discloses a process for preparing aminofunctional organopolysiloxanes which comprises equilibrating a mixture containing an organopolysiloxane and an aminofunctional silane or siloxane in the presence of a catalyst. Martin further discloses that the aminofunctional groups present in the organopolysiloxanes which are prepared can be reacted with organic or inorganic acids to form the corresponding ammonium salts. Cifuentes et al. in U.S. Pat. No. 5,110,891 teaches a polish formulation which contains a reactive amine functional silicone polymer.

Furthermore, other water-insoluble ammonium siloxanes which result from the reaction of amino-siloxanes and organic carboxylic acids have been taught. For example, Imperante et al. in U.S. Pat. No. 5,115,049 discloses fatty carboxylic acid salts of organofunctional silicone amines where the amino pendant functionality is present within the polymer.

Unreactive linear amino-siloxanes have also been described. For example, Bailey in U.S. Pat. No. 2,947,771 discloses the production of endblocked organopolysiloxanes containing among other siloxane units, aminoalkylalkylsiloxane or aminoalkylarylsiloxane units in which the amino group is linked to the silicon atoms through a polymethylene chain of at least three carbon atoms.

Organopolysiloxane emulsions have also been described in the art. For example, Hyde et al. in U.S. Pat. No. 2,891,920 teaches an organopolysiloxane emulsion formed by an emulsion polymerization where the polysiloxane, emulsifying agent such as a cationic, anionic, or nonionic surfactant, catalyst such as a strong mineral acid or strong alkali, and water are blended together in various orders of addition to form an emulsion and then allowed to react at room temperature or greater.

Findley et al. in U.S. Pat. No. 3,294,725 discloses an organopolysiloxane emulsion formed by polymerizing and copolymerizing an organosiloxane or a silcarbane in an aqueous medium while in a dispersed state, in the presence of a surface active sulfonic acid catalyst.

Cekada et al. in U.S. Pat. No. 3,433,780 teaches colloidal suspensions of silesquioxanes having an average particle size in the range of 10 to 1000 A and having the unit formula $RSiO_{3/2}$, wherein R is a hydrocarbon or a substituted hydrocarbon radical having 1 to 7 carbon atoms, in a water-surfactant mixture. It is further disclosed that these suspensions are prepared by adding the appropriate silane to a water-surfactant mixture with agitation.

Polyorganosiloxane microemulsions have also been disclosed. For example, Gee, in U.S. Pat. No. 4,620,878 discloses a method of preparing fine polyorganosiloxane emulsions having an average particle size of less than 0.3 micron and polyorganosiloxane microemulsions with an average particle size of less than 0.14 micron by preparing a translucent oil concentrate by mixing a polyorganosiloxane having polar groups such as an amino group, a surfactant which is insoluble in the polyorganosiloxane, and sufficient water to obtain the translucent mixture, the translucent concentrate is then rapidly dispersed in water to form the emulsion or microemulsion.

Gravier et al. in U.S. Pat. No. 4,999,398 discloses a clear, stable, aqueous microemulsion of polydiorganosiloxane produced by sequentially adding a precursor emulsion comprised of cyclopolydiorganosiloxane, surfactant, and water to a polymerization medium comprising water and an effective amount of a polymerization catalyst while mixing wherein the rate of addition of the precursor emulsion is effective to form a clear, stable microemulsion which has polydiorganosiloxane droplets of less than 0.15 micron average particle size, and which contains a surfactant to polydiorganosiloxane weight ratio of 0.15 to 5.

SUMMARY OF THE INVENTION

The present invention relates to ammonium siloxane emulsions, a method of making ammonium siloxane emulsions, and the use of these emulsions as fiber treatment agents.

It is an object of the present invention to produce emulsions which contain linear silicone-unreactive water-soluble ammonium functional siloxanes.

It is a further object of this invention to produce ammonium functional siloxane emulsions which are useful as fiber treatment agents.

It is another object of this invention to prepare ammonium functional siloxane emulsions which, when applied to fibers such as paper pulp or tissue, render the fibers soft and smooth to the touch.

It is another object of this invention to produce silicone emulsions in which the water-soluble ammonium functional siloxane compositions contained therein have at least 10 mole percent ammonium-methylsiloxane functionality.

DETAILED DESCRIPTION OF THE INVENTION

The present invention relates, in a first embodiment, to a silicone emulsion comprising (I) an ammonium siloxane composition comprising (A) 0.01 to 90 weight percent of an aminosiloxane blend comprising a mixture of (i) an aminofunctional siloxane having its formula selected from the group consisting of (a) $R_3SiO(Me_2SiO)_x(RR^1SiO)_y(RR^2SiO)_zSiR_3$ and (b) $R_3SiO(Me_2SiO)_x(RR^1SiO)_ySiR_3$, and (ii) an aminofunctional siloxane having its formula selected from the group consisting of (a) $R_3SiO(Me_2SiO)_x(RR^1SiO)_y(RR^2SiO)_zSiR_2OH$ and (b) $R_3SiO(Me_2SiO)_x(RR^1SiO)_ySiR_2OH$, and (iii) an aminofunctional siloxane having its formula selected from the group consisting of (a) $HOR_2SiO(Me_2SiO)_x(RR^1SiO)_y(RR^2SiO)_zSiR_2OH$ and (b) $HOR_2SiO(Me_2SiO)_x(RR^1SiO)_ySiR_2OH$, (B) 0.1 to 90 weight percent of a cyclic aminofunctional siloxane having the formula (i) 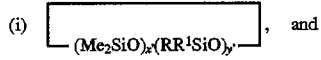, and and (C) 0.1 to 10 weight percent of a compound having the formula:

(i) 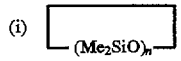

wherein Me denotes methyl, R is independently a monovalent hydrocarbon radical having from 1 to 6 carbon atoms or an aryl radical, $R^1$ is a group having its formula selected from the group consisting of

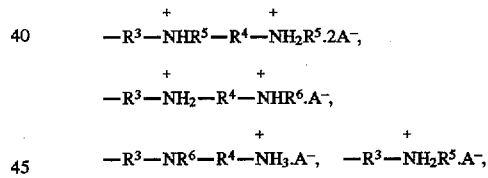

and wherein $R^3$ is a divalent hydrocarbon radical having at least 3 carbon atoms, $R^4$ is a divalent hydrocarbon radical having at least 2 carbon atoms, $R^5$ is selected from the group consisting of hydrogen, an alkyl radical having from 1 to 6 carbon atoms, an aryl radical, and an arylalkyl radical, $R^6$ is a —C(O)$R^7$ group where $R^7$ is selected from the group consisting of a monovalent hydrocarbon group having from 1 to 20 carbon atoms and an aryl radical, and $A^-$ is an anion selected from the group consisting of halide anions, carboxylate anions, and inorganic oxoanions, $R^2$ is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1; and (II) an organopolysiloxane emulsion.

The monovalent hydrocarbon radicals of R in component (I) are exemplified by alkyl radicals such as methyl, ethyl, propyl, pentyl, or hexyl, and the aryl radicals are exemplified by phenyl, tolyl, or xylyl. In the compositions of this invention R is preferably methyl or phenyl. The monovalent hydrocarbon radicals of $R^2$ are exemplified by ethyl, propyl, butyl, pentyl, or hexyl and the aryl radicals are as defined above for R. Preferably $R^2$ is independently selected from the group consisting of ethyl, propyl, butyl, hexyl, phenyl, tolyl, and xylyl.

In component (I), the divalent hydrocarbon radicals of $R^3$ are exemplified by groups such as alkylene groups including propylene, butylene, pentylene, trimethylene, 2-methyltrimethylene, pentamethylene, hexamethylene, 3-ethyl-hexamethylene, octamethylene, —$CH_2(CH_3)CH$—, —$CH_2CH(CH_3)CH_2$—, —$(CH_2)_{18}$—, and cycloalkylene radicals such as cyclohexylene, arylene radicals such as phenylene, combinations of divalent hydrocarbon radicals such as benzylene (—$C_6H_4CH_2$—), and oxygen containing groups such as —$CH_2OCH_2$—, $CH_2CH_2CH_2OCH_2$—, —$CH_2CH_2OCH_2CH_2$—, —$COOCH_2CH_2OOC$—, —$CH_2CH_2OCH(CH_3)CH_2$—, and —$CH_2OCH_2CH_2OCH_2CH_2$—. Preferably $R^3$ is selected from the group consisting of propylene, butylene, pentylene, trimethylene, 2-methyltrimethylene, pentamethylene, hexamethylene, 3-ethyl-hexamethylene, and octamethylene.

In component (I), the divalent hydrocarbon radicals of $R^4$ are exemplified by ethylene or any of the divalent hydrocarbon radicals delineated for $R^3$ hereinabove. Preferably $R^4$ is selected from the group consisting of ethylene, propylene, butylene, pentylene, trimethylene, 2-methyltrimethylene, pentamethylene, hexamethylene, 3-ethyl-hexamethylene, and octamethylene.

In component (I), the alkyl radicals and aryl radicals of $R^5$ are as delineated for R hereinabove. The arylalkyl radicals of $R^5$ are exemplified by benzyl and 2-phenylethyl. It is preferred that $R^5$ is selected from the group consisting of hydrogen, methyl, phenyl, and benzyl.

The group $R^6$ is a

group where $R^7$ is a monovalent hydrocarbon group having from 1 to 20 carbon atoms or an aryl radical. The monovalent hydrocarbon groups of $R^7$ are exemplified by methyl, ethyl, propyl, —$C_6H_5$, and a group having the formula —$(CH_2)_nCH_3$ where n has a value of 4 to 18.

In component (I), the halide anions of $A^-$ are exemplified by $Cl^-$, $Br^-$, $I^-$, and $F^-$, the carboxylate anions of $A^-$ are exemplified by $CH_3COO^-$, $HOCH_2COO^-$, $C_6H_5COO^-$, $HOC_6H_4COO^-$, $CH_3CH_2COO^-$, $CH_3CH_2CH_2COO^-$, $CH_3(CH(OH)CH_2COO^-$, $CH_3(CH_2)_4COO^-$, $CH_3(CH_2)_3CH(OH)COO^-$, $CH_3(CH_2)_6COO^-$, $CH_3(CH_2)_8COO^-$, $HO(CH_2)_9COO^-$, $CH_3(CH_2)_{10}COO^-$, $HO(CH_2)_{11}COO^-$, $CH_3(CH_2)_{14}COO^-$, $HO(CH_2)_{15}COO^-$, $CH_3(CH_2)_{16}COO^-$, $CH_3(CH_2)_5CH(OH)(CH_2)_{10}COO^-$, and $ClC_6H_4COO^-$, and the inorganic oxoanions are exemplified by $ClO^-$, $ClO_3^-$, $ClO_2^-$, $ClO_4^-$, $SO_4^=$, $PO_4^\equiv$, $HCO_2^-$, $NO_3^-$, $CO_3^=$, and $HCO_3^-$.

Preferably, (A)(i) is an aminofunctional siloxane having the formula $Me_3SiO(Me_2SiO)_x(MeR^1SiO)_ySiMe_3$, (A)(ii) is an aminofunctional siloxane having the formula $Me_3SiO(Me_2SiO)_x(MeR^1SiO)_ySiMe_2OH$, (A)(iii) is an aminofunctional siloxane having the formula $HOMe_2SiO(Me_2SiO)_x(MeR^1SiO)_ySiMe_2OH$, and (B) is a cyclic aminofunctional siloxane having the average formula:

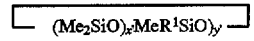

wherein $R^1$ is a group having its formula selected from the group consisting of:

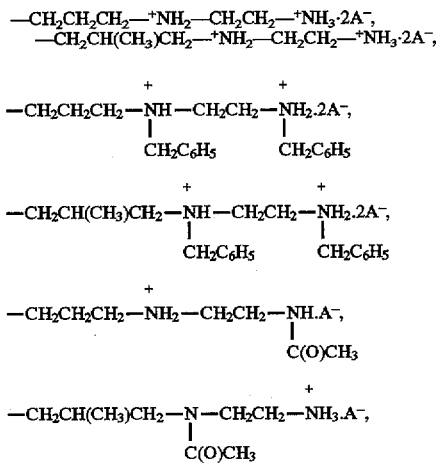

wherein $A^-$ is selected from the group consisting of $CH_3COO^-$, $Cl^-$, $HOCH_2COO^-$, $C_6H_5COO^-$ and $HOC_6H_4COO^-$ wherein x, y, x', and y' are as defined above.

It is also preferred that component (I), x has a value of 10 to 100, y has a value of 5 to 50, x' has a value of 2 to 3.5, and y' has a value of 0.5 to 2 with the proviso that the value of x'+y' is 4.

In component (I) there is present 0.01 to 90 weight percent of component (A), 0.1 to 90 weight percent of component (B), and 0.1 to 10 weight percent of component (C) such that the combined weight percent of components (A)+(B)+(C) is 100 weight percent.

Component (I), the ammonium siloxane composition, should be present in the silicone emulsion compositions of this invention in an amount ranging from 0.1 to 50 weight percent, and preferably 0.1 to 10 weight percent.

The organopolysiloxane emulsion of component (II) preferably comprises (A) an organopolysiloxane polymer, (B) at least one surfactant, and (C) water. The organopolysiloxane polymer (A) of component (II) is preferably a compound having the formula $R^8{}_3SiO(R^8{}_2SiO)_aSiR^8{}_3$, wherein $R^8$ is independently a monovalent hydrocarbon radical having from 1 to 20 carbon atoms or an aryl radical, and a has a value of greater than zero to 1000.

The monovalent hydrocarbon radicals of $R^8$ are exemplified by alkyl radicals such as methyl, ethyl, propyl, butyl, hexyl, octyl, and decyl, cycloaliphatic radicals, such as cyclohexyl, aryl radicals such as phenyl, tolyl, and xylyl, aralkyl radicals such as benzyl and phenylethyl. It is preferred that $R^8$ is methyl or phenyl. Preferably a has a value of 10 to 200. It is especially preferred that the organopolysiloxane polymer is a compound having the formula $Me_3SiO(Me_2SiO)_aSiMe_3$ wherein a has a value such that the viscosity of the organopolysiloxane polymer ranges from about 100 to about 1000 mm²/s (1 mm²/s=1 centistoke (cS)).

The organopolysiloxane also comprises (B) at least one surfactant. The surfactant may be an anionic, cationic, nonionic, or amphoteric surfactant. The (emulsifying agents) surfactants may be employed separately or in combinations of two or more. Suitable emulsifying agents for the preparation of a stable aqueous emulsion are known in the art.

Examples of suitable anionic surfactants include alkali metal sulforicinates, sulfonated glyceryl esters of fatty acids such as sulfonated monoglycerides of coconut oil acids, salts of sulfonated monovalent alcohol esters such as sodium oleylisethianate, amides of amino sulfonic acids such as the sodium salt of oleyl methyl tauride, sulfonated products of fatty acids nitriles such as palmitonitrile sulfonate, sulfonated aromatic hydrocarbons such as sodium alpha-naphthalene monosulfonate, condensation products of naphthalene sulfonic acids with formaldehyde, sodium octahydroanthracene sulfonate, alkali metal alkyl sulfates such as ammonium lauryl sulfate or triethanol amine lauryl sulfate, ether sulfates having alkyl groups of 8 or more carbon atoms such as sodium lauryl ether sulfate or sodium alkyl aryl ether sulfates, alkylarylsulfonates having 1 or more alkyl groups of 8 or more carbon atoms, alkylbenzenesulfonic acids which are exemplified by hexylbenzenesulfonic acid, octylbenzenesulfonic acid, decylbenzenesulfonic acid, dodecylbenzenesulfonic acid, cetylbenzenesulfonic acid, and myristylbenzenesulfonic acid, salts of alkylbenzenesulfonic acids, sulfuric esters of polyoxyethylene alkyl ether including $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4O)_8SO_3H$, $CH_3(CH_2)_{19}CH_2O(C_2H_4O)_4SO_3H$, and $CH_3(CH_2)_{10}CH_2O(C_2H_4O)_6SO_3H$, sodium salts, potassium salts, and amine salts of alkylnaphthylsulfonic acid.

Examples of cationic surfactants include various fatty acid amines and amides and their derivatives, and the salts of the fatty acid amines and amides. Examples of aliphatic fatty acid amines include dodecylamine acetate, octadecylamine acetate, and acetates of the amines of tallow fatty acids, homologues of aromatic amines having fatty acids such as dodecylanalin, fatty amides derived from aliphatic diamines such as undecylimidazoline, fatty amides derived from aliphatic diamines such as undecylimidazoline, fatty amides derived from disubstituted amines such as oleylaminodiethylamine, derivatives of ethylene diamine, quaternary ammonium compounds and their salts which are exemplified by tallow trimethyl ammonium chloride, dioctadecyldimethyl ammonium chloride, didodecyldimethyl ammonium chloride, dihexadecyl ammonium chloride, alkyltrimethylammonium hydroxides such as octyltrimethylammonium hydroxide, dodecyltrimethylammonium hydroxide, or hexadecyltrimethylammonium hydroxide, dialkyldimethylammonium hydroxides such as octyldimethylammonium hydroxide, decyldimethylammonium hydroxide, didodecyldimethylammonium hydroxide, dioctadecyldimethylammonium hydroxide, tallow trimethylammonium hydroxide, coconut oil, trimethylammonium hydroxide, methylpolyoxyethylene cocoammonium chloride, and dipalmityl hydroxyethylammonium methosulfate, amide derivatives of amino alcohols such as beta-hydroxylethylstearylamide, and amine salts of long chain fatty acids.

Examples of nonionic surfactants include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, and polyoxyalkylene glycol modified polysiloxane surfactants.

Examples of the amphoteric surfactants that can be used include amino acid surfactants and betaine acid surfactants. Combinations of 2 or 3 types of nonionic surfactants, combinations of nonionic surfactants and anionic surfactants, and combinations of nonionic surfactants and cationic surfactants can also be employed as component (B).

Preferred surfactants as component (B) include trimethylnonyl polyethylene glycol ethers and polyethylene glycol ether alcohols containing linear alkyl groups having from 11 to 15 such as 2,6,8-trimethyl-4-nonyloxypolyethylene oxyethanol (6 EO) (sold as Tergitol®TMN-6 by OSi Specialties, A Witco Company, Endicott, N.Y.), 2,6,8-trimethyl-4-nonyloxypolyethylene oxyethanol (10 EO) (sold as Tergitol®TMN-10 by OSi Specialties, A Witco Company, Endicott, N.Y.), alkylene-oxypolyethylene oxyethanol ($C_{11-15}$ secondary alkyl, 9 EO) (sold as Tergitol®15-S-9 by OSi Specialties, A Witco Company, Endicott, N.Y.), alkylene-oxypolyethylene oxyethanol ($C_{11-15}$ secondary alkyl, 15 EO) (sold as Tergitol®15-S-15 by OSi Specialties, A Witco Company, Endicott, N.Y.), octylphenoxy polyethoxy ethanols having varying amounts of ethylene oxide units such as octylphenoxy polyethoxy ethanol (40 EO) (sold as Triton® X405 by Rohm and Haas Company, Philadelphia, Pa.), nonionic ethoxylated tridecyl ethers available from Emery Industries, Mauldin, S.C. under the general tradename Trycol, alkali metal salts of dialkyl sulfosuccinates available from American Cyanamid Company, Wayne, N.J. under the general tradename Aerosol, polyethoxylated quaternary ammonium salts and ethylene oxide condensation products of the primary fatty amines, available from Armak Company, Chicago, Ill. under the tradenames Ethoquad, Ethomeen, or Arquad, and polyoxyalkylene glycol modified polysiloxanes. These preferred surfactants may also be obtained from other suppliers under different tradenames.

Surfactant (B) should be present in the organopolysiloxane emulsion compositions in an amount ranging from 1 to 20 parts by weight, and preferably 1 to 10 parts by weight per 100 parts by weight of organopolysiloxane polymer (A) of component (II).

Water (C) forms the remainder of component (II) in the compositions of this invention and is generally present at a level of from about 50 to 95 parts by weight, preferably from about 60 to about 90 parts by weight per 100 parts by weight of organopolysiloxane polymer (A) of component (II).

Preparation of the organopolysiloxane emulsions of component (II) can be carried out by any conventional technique and are generally separated into two types, mechanical means and emulsion polymerization means. Mechanical means typically involve homogenizing a mixture of a polydiorganosiloxane, one or more surfactants, and water using milling machinery such as a colloid mill or a sonolator to obtain the desired droplet sizes. Emulsion polymerization methods for making emulsions involve starting with low viscosity polymer precursors such as monomers or reactive oligomers, which are immiscible in water, a surfactant to stabilize the polymer precursor droplet in water, and a water soluble polymerization catalyst which will polymerize cyclopolysiloxanes in the presence of water such as quaternary ammonium hydroxides, for example tallow trimethylammonium hydroxide, quaternary ammonium chlorides such as tallow trimethylammonium chloride, metal hydroxides such as sodium hydroxide, strong mineral acids, aliphatically substituted benzenesulfonic acids, and aliphatic sulfonic acids. These components are added to water, the mixture is stirred and polymerization is allowed to advance until the reaction is complete or the desired degree of polymerization is reached and a standard emulsion of the polymer is formed.

Component (II), the organopolysiloxane emulsion, should be present in the silicone emulsion compositions of this invention in an amount ranging from 50 to 99.9 weight percent, and preferably 90 to 99.9 weight percent. In the silicone emulsions of the present invention Components (I) and (II) are present in the amounts described above such that the combined weight percent of components (I)+(II) is 100 weight percent.

The silicone emulsions of this invention can be prepared by homogeneously mixing Components (I) and (II) and any optional components in any order. Thus it is possible to mix all components in one mixing step immediately prior to using the emulsion compositions of the present invention. The silicone emulsions of the present invention may also be in the form of silicone macroemulsions or silicone microemulsions and may also contain optional ingredients, for example antifreeze additives, biocides, organic softeners, antistatic agents, preservatives, dyes and flame retardants. Preferred preservatives include Kathon® LX (5-chloro-2-methyl-4-isothiazolin-3-one from Rohm and Haas, Philadelphia, Pa. 19106), Giv-gard® DXN (6-acetoxy-2,4-dimethyl-m-dioxane from Givaudan Corp., Clifton N.J. 07014), Tektamer® A.D. (from Calgon Corp., Pittsburgh, Pa. 152300), Nuosept® 91,95 (from Huls America, Inc., Piscataway, N.J. 08854), Germaben® (diazolidinyl urea and parabens from Sutton Laboratories, Chatham, N.J. 07928), Proxel® (from ICI Americas Inc., Wilmington, Del. 19897), methyl paraben, propyl paraben, sorbic acid, benzoic acid, and lauricidin. The above optional components can be present in the silicone emulsions up to about 20 weight percent of the total composition, however it is preferred that the optional components comprise up to 5 weight percent of the total composition.

In a second embodiment, the present invention relates to a method of making a silicone emulsion comprising the steps of (I) mixing (i) a blend comprising (A) 0.01 to 90 weight percent of an aminosiloxane solution comprising a mixture of (i) an aminofunctional siloxane having its formula selected from the group consisting of (a) $R_3SiO(Me_2SiO)_x(RR^1SiO)_y(RR_2SiO)_zSiR_3$ and (b) $R_3SiO(Me_2SiO)_x(RR^1SiO)_ySiR_3$, and (ii) an aminofunctional siloxane having its formula selected from the group consisting of (a) $R_3SiO(Me_2SiO)_x(RR^1SiO)_y(RR_2SiO)_zSiR_2OH$ and (b) $R_3SiO(Me_2SiO)_x(RR^1SiO)_ySiR_2OH$, and (iii) an aminofunctional siloxane having its formula selected from the group consisting of (a) $HOR_2SiO(Me_2SiO)_x(RR^1SiO)_y(RR^2SiO)_zSiR_2OH$ and (b) $HOR_2SiO(Me_2SiO)_x(RR^1SiO)_ySiR_2OH$, (B) 0.1 to 90 weight percent of a cyclic aminofunctional siloxane having the average formula

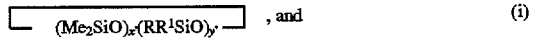 , and (i)

(C) 0.1 to 10 weight percent of a compound having the average formula:

 (i)

wherein Me denotes methyl, R is independently a monovalent hydrocarbon radical having from 1 to 6 carbon atoms or an aryl radical, $R^1$ is a group having its formula selected from the group consisting of —$R^3NH$—$R^4$—$NH_2$ and —$R^3$—$NH_2$ wherein $R^3$ is a divalent hydrocarbon radical having at least 3 carbon atoms, $R^4$ is a divalent hydrocarbon radical having at least 2 carbon atoms, $R^2$ is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1; (ii) an acid compound; and (iii) water to form a water soluble ammonium siloxane composition; and (II) adding the water soluble ammonium siloxane composition of step (I) to an organopolysiloxane emulsion.

In the above method, the monovalent hydrocarbon radicals and aryl radicals of R are as described hereinabove. Preferably R is methyl or phenyl. The monovalent hydrocarbon radicals and aryl radicals of $R^2$ are as described hereinabove. Preferably $R^2$ is independently selected from the group consisting of ethyl, propyl, butyl hexyl, phenyl, tolyl, and xylyl.

The divalent hydrocarbon radicals of $R^3$ are as described hereinabove. Preferably $R^3$ is selected from the group consisting of propylene, butylene, pentylene, trimethylene, 2-methyltrimethylene, pentamethylene, hexamethylene, 3-ethyl-hexamethylene, and octamethylene.

The divalent hydrocarbon radicals of $R^4$ are as described hereinabove. Preferably $R^4$ is selected from the group consisting of ethylene, propylene, butylene, pentylene, trimethylene, 2-methyltrimethylene, pentamethylene, hexamethylene, 3-ethyl-hexamethylene, and octamethylene.

In this method of the invention it is preferred that (A)(i) is an aminofunctional siloxane having the formula $Me_3SiO(Me_2SiO)_x(MeR^1SiO)_ySiMe_3$, (A)(ii) is an aminofunctional siloxane having the formula $Me_3SiO(Me_2SiO)_x(MeR^1SiO)_ySiMe_2OH$, (A)(iii) is an aminofunctional siloxane having the formula $HOMe_2SiO(Me_2SiO)_x(MeR^1SiO)_ySiMe_2OH$, and (B) is a cyclic aminofunctional siloxane having the formula:

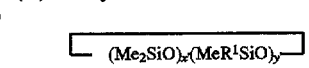

wherein $R^1$ is a group having its formula selected from the group consisting of —$CH_2CH_2CH_2$—$NH$—$CH_2CH_2$—$NH_2$, —$CH_2CH(CH_3)CH_2$—$NH$—$CH_2CH_2$—$NH_2$, and —$CH_2CH_2CH_2$—$NH_2$ wherein x, y, x', and y' are as defined above.

It is preferred in this method of the invention that x has a value of 10 to 100, y has a value of 5 to 50, x' has a value of 2 to 3.5, and y' has a value of 0.5 to 2 with the proviso that the value of x'+y' is 4.

In the method of the present invention there is present in component (i), 0.01 to 90 weight percent of component (A), 0.1 to 90 weight percent of component (B), and 0.1 to 10 weight percent of component (C) such that the combined weight percent of components (A)+(B)+(C) is 100 weight percent.

It is preferred for purposes of this invention that from 0.01 to 90 weight percent of Component (i) is used, and it is highly preferred that from 0.1 to 90 weight percent of Component (i) be employed.

The acid compound of component (ii) in this method of the invention can be an inorganic acid or an organic acid and can be a strong acid or a weak acid. Preferably the acid is a mineral acid or a carboxylic acid. The carboxylic acid can be for example, an aliphatic carboxylic acid exemplified by acetic acid ann formic acid, or an aromatic carboxylic acid exemplified by benzoic acid or salicylic acid. Acids suitable as component (ii) include $CH_3COOH$ (acetic acid), HCOOH (formic acid), $HOCH_2COOH$ (glycolic acid), $C_6H_5COOH$ (benzoic acid), $HOC_6H_4COOH$ (2-, 3-, or 4-hydroxybenzoic acid), $CH_3CH_2COOH$ (propionic acid), $CH_3CH_2CH_2COOH$ (butyric acid), $CH_3CH(OH)CH_2COOH$ (3-hydroxybutyric acid), $CH_3(CH_2)_4COOH$ (hexanoic acid), $CH_3(CH_2)_3CH(OH)COOH$ (2-hydroxyhexanoic acid), $CH_3(CH_2)_6COOH$ (octanoic acid), $CH_3(CH_2)_8COOH$ (decanoic acid), $HO(CH_2)_9COOH$ (10-hydroxydecanoic acid), $CH_3(CH_2)_{10}COOH$ (lauric acid), $HO(CH_2)_{11}COOH$ (12-hydroxydodecanoic acid), $CH_3(CH_2)_{14}COOH$ (palmitic acid), $HO(CH_2)_{15}COOH$ (16-hydroxyhexadecanoic acid), $CH_3(CH_2)_{16}COOH$ (stearic acid), $CH_3(CH_2)_5CH(OH)(CH_2)_{10}COOH$ (12-hydroxystearic acid), $CH_3(CH_2)_7CH=CH(CH_2)_7COOH$ (oleic acid), $ClC_6H_4COOH$ (2-, 3-, or 4-chlorobenzoic acid), HCl (hydrochloric acid), HBr (hydrobromic acid), HI (hydrogen iodide), HF (hydrogen fluoride), $H_2CO_2$ (formic acid), $HNO_3$ (nitric acid), $H_3PO_4$ (phosphoric acid), $H_2CO_3$ (carbonic acid), $H_2SO_4$ (sulfuric acid), $HClO_4$ (perchloric acid), $HClO_3$ (chloric acid), $HClO_2$ (chlorous acid), and HClO (hyprochloric acid).

It is preferred for purposes of this invention that from 0.01 to 50 weight percent of Component (ii) is used, and it is highly preferred that from 0.1 to 10 weight percent of Component (ii) be employed.

Component (iii) in this method of the invention is water. It is preferred for purposes of this invention that from 1 to 99.9 weight percent of Component (iii) is used, and it is highly preferred that from 10 to 99.9 weight percent of Component (iii) be employed.

In the method of this invention, Component (i) is present at 0.01 to 90 weight percent, Component (ii) is present at 0.01 to 50 weight percent, and Component (iii) is present at 1 to 99.9 weight percent such that the combined weight percent of components (i)+(ii)+(iii) is 100 weight percent. In Step (I), components (i), (ii), and (iii) are mixed and/or agitated preferably until a homogeneous mixture is formed.

The organopolysiloxane emulsion of step (II) in this method of the invention is as described hereinabove including preferred embodiments and amounts thereof. The water soluble ammonium siloxane composition of Step (I) is then added to the organopolysiloxane emulsion in step (II). About 0.1 to 50 weight percent of water soluble ammonium siloxane composition can be added to the organopolysiloxane emulsion, however, it is preferred that about 0.1 to 10 weight percent of the ammonium siloxane composition formed in step (I) is added to the organopolysiloxane emulsion, the organopolysiloxane emulsion making up the remainder of the silicone emulsion (i.e. the water soluble ammonium siloxane composition+organopolysiloxane emulsion is equal to 100 weight percent).

The method of this invention can further comprise adding an acid anhydride during step (I). The acid anhydride is exemplified by $(CH_3CO)_2O$ (acetic anhydride), $(C_6H_5CO)_2O$ (benzoic anhydride), $CH_3CH_2COOCOCH_2CH_3$ (proprionic anhydride), $(CH_3CH_2CH_2CO)_2O$ (butyric anhydride), $(CH_3(CH_2)_4CO)_2O$ (hexanoic anhydride), $(CH_3(CH_2)_8CO)_2O$ (decanoic anhydride), $(CH_3(CH_2)_{10}CO)_2O$ (lauric anhydride), $(CH_3(CH_2)_{14}CO)_2O$ (palmitic anhydride), $(CH_3(CH_2)_{16}CO)_2O$ (stearic anhydride).

It is preferred that if an acid anhydride is employed, that from 0.01 to 20 weight parts of acid anhydride is used, and it is highly preferred that from 0.01 to 10 weight parts of acid anhydride be employed per 100 weight parts of components (i)+(ii)+(iii).

The method of this invention can further comprise adding an aryl halide during step (I). The aryl halide is exemplified by benzyl chloride, benzyl bromide, benzyl iodide, benzyl fluoride, phenyl chloride, phenyl bromide, or phenyl fluoride.

It is preferred that if an aryl halide is employed, that from 0.01 to 10 weight parts of aryl halide is used, and it is highly preferred that from 0.01 to 5 weight parts of aryl halide be employed per 100 weight parts of components (i)+(ii)+(iii).

In a third embodiment, the present invention relates to a method of treating a substrate, the method comprising the step of (I) applying to a substrate a silicone emulsion wherein the silicone emulsion comprises the silicone emulsion described in the first embodiment of this invention hereinabove including preferred embodiments and amounts thereof.

The silicone emulsions of this invention may be applied to the substrate by employing any suitable application technique, for example by padding or spraying, or from a bath. The concentration of the treating solution will depend on the desired level of application of siloxane to the substrate, and on the method of application employed, but it is believed by the inventors herein that the most effective amount of the silicone emulsion should be in the range such that the substrate picks up the silicone composition at about 0.05% to 10% based on the weight of the substrate.

In this method of the invention the substrate is preferably a fiber or fabric. The fibers usually in the form of tow, or knitted or woven fabrics, are immersed in the silicone emulsion whereby the emulsion becomes selectively deposited on the fibers. The deposition of the silicone emulsion on the fibers may also be expedited by increasing the temperatures of the bath with temperatures in the range of from 20° to 60° C. being generally preferred.

The silicone emulsions of this invention can be employed for the treatment of substrates such as animal fibers such as wool, cellulosic fibers such as cotton, and synthetic fibers such as nylon, polyester and acrylic fibers, or blends of these materials, for example, polyester/cotton blends, and may also be used in the treatment of leather, paper, paper pulp, tissues such as bath tissue or facial tissue, and gypsum board. The fibers may be treated in any form, for example as knitted and woven fabrics and as piece goods. They may also be treated as agglomerations of random fibers as in filling materials for pillows and the like such as fiberfil. The compositions of the invention are especially useful for treating paper pulp and bath or facial tissue.

In this embodiment of the invention the method can further comprise heating the substrate after step (I). Thus following the application of the silicone emulsion to the substrate, the siloxane can then be cured. Preferably curing is expedited by exposing the treated fibers to elevated temperatures, preferably from 50° to 200° C.

The silicone emulsion of this invention should be used at about 0.05 to 25 weight percent in the final bath for exhaust method applications, and about 5 gm/l to 80 gm/l in a padding method of application, and about 5 gm/l to 600 gm/l for a spraying application. The fibers or fabrics treated with the emulsions of this invention have superior slickness, have no oily feeling, and are soft to the touch.

EXAMPLES 1–15

A water soluble ammonium siloxane composition was prepared by mixing about 33 weight percent of an aminosiloxane solution and 3.0 weight percent of glacial acetic acid in a container under nitrogen. Next, about 64 weight percent of water was added to this mixture and the mixture was then agitated until it was homogenous.

The aminosiloxane solution contained about (i) 44 weight percent of a mixture of an aminofunctional siloxane having the average formula $Me_3SiO(Me_2SiO)_{23}(MeRSiO)_{13}SiMe_3$, an aminofunctional siloxane having the average formula $Me_3SiO(Me_2SiO)_{23}(MeRSiO)_{13}SiMe_2OH$, and an aminofunctional siloxane having the average formula $HOMe_2SiO(Me_2SiO)_{23}(MeRSiO)_{13}SiMe_2OH$, (ii) 51 weight percent of an aminofunctional siloxane having the average formula

[(Me₂SiO)ₓ(MeRSiO)ᵧ] , and (iii) 5 weight percent of a cyclosiloxane having the formula

[(Me₂SiO)ₙ]

where R is a group having the formula —CH$_2$CH(CH$_3$) CH$_2$—NH—CH$_2$CH$_2$—NH$_2$, the value of x'+y' is from 4 to 9, and n has an average value of 4 to 9. The resulting solution (example) contained components (i), (ii), and (iii) in the amounts delineated above however, R was a group having the formula

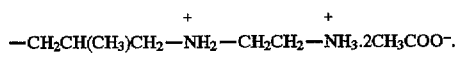

—CH$_2$CH(CH$_3$)CH$_2$—NH$_2^+$—CH$_2$CH$_2$—NH$_3^+$.2CH$_3$COO$^-$.

Next, an amount of this ammonium siloxane solution was mixed with three different organopolysiloxane emulsions:

Organopolysiloxane Emulsion A contained about 55 weight percent of an organopolysiloxane polymer having the formula Me$_3$SiO(Me$_2$SiO)$_a$SiMe$_3$ and having a viscosity of about 350 mm$^2$/s, about 3 weight percent of a nonionic surfactant (Tergitole®TMN-6 (2,6,8-trimethyl-4-nonyloxypolyethylene oxyethanol (6 EO)) sold by OSi Specialties, A Witco Company, Endicott, N.Y.), about 0.2 weight percent of a cationic surfactant (tallow trimethyl ammonium chloride) and about 41 weight percent of water. The emulsion also contained a preservative (2-methyl-4-Isothiazolin-3-One).

Organopolysiloxane Emulsion B contained about 50 weight percent of an organopolysiloxane polymer having the formula Me$_3$SiO(Me$_2$SiO)$_a$SiMe$_3$ and having a viscosity of about 350 mm$^2$/s, about 3.9 weight percent of a nonionic surfactant (a polyoxyethylene lauryl ether having (2–3 EO), about 1.5 weight percent of a nonionic surfactant (a polyoxyethylene lauryl ether (23 EO)), and 43 weight percent water. The emulsion also contained a biocide (glycerine).

Organopolysiloxane Emulsion C contained about 60 weight percent of an organopolysiloxane polymer having the formula Me$_3$SiO(Me$_2$SiO)$_a$SiMe$_3$ and having a viscosity of about 350 mm$^2$/s, about 3 weight percent of a nonionic surfactant (Tergitole®TMN-6 (2,6,8-trimethyl-4-nonyloxypolyethylene oxyethanol (6 EO)) sold by OSi Specialties, A Witco Company, Endicott, N.Y.), about 0.2 weight percent of an anionic surfactant (sodium alkyl aryl ether sulfate), and about 36 weight percent of water. The emulsion also contained a preservative (Giv-gard® DXN Bactericide (6-acetoxy-2,4-dimethyl-m-dioxane) from Givaudan Corp., Clifton N.J. 07014). The amount of solution and the amount and type of organopolysiloxane emulsion for each example is shown in Table 1 hereinbelow.

TABLE 1

| Example | Wt % Solution | Wt % Emulsion | Organopolysiloxane Emulsion |
|---|---|---|---|
| 1 | 0.1 | 99.9 | A |
| 2 | 0.5 | 99.5 | A |
| 3 | 1.0 | 99.0 | A |
| 4 | 5.0 | 95.0 | A |
| 5 | 10.0 | 90.0 | A |
| Control | 0.0 | 100.0 | A |
| 6 | 0.1 | 99.9 | B |
| 7 | 0.5 | 99.5 | B |
| 8 | 1.0 | 99.0 | B |
| 9 | 5.0 | 95.0 | B |
| 10 | 10.0 | 90.0 | B |
| Control | 0.0 | 100.0 | B |
| 11 | 0.1 | 99.9 | C |
| 12 | 0.5 | 99.5 | C |
| 13 | 1.0 | 99.0 | C |
| 14 | 5.0 | 95.0 | C |
| 15 | 10.0 | 90.0 | C |
| Control | 0.0 | 100.0 | C |

Each silicone emulsion prepared above was then placed on the fabric by soaking a 12.5 inch by 10 inch 100% cotton sheet in the solution in a 400 g bath. The sheet was removed, run through a padder to dry and placed in a 150° C. oven for 3.5 minutes to dry.

These sheets were then tested for relative hand value. The relative hand value was determined by a survey of panelists. The panelists first rank treated samples in order of increasing softness. This ranking is then repeated a number of times to insure reproducibility. Samples are then given ratings based on comparisons to the controls and each other. The rating scale is between 0 and 5 in increments of 0.25, with the higher ratings indicating increased softness. A rating difference of 0.25 between samples indicates that the panelists could consistently detect a difference in the softness after handling the samples for a period of about 15 seconds. When two samples were 0.50 points apart, panelists could perceive a difference in around 5 seconds, while a difference of 0.75 or higher indicated an immediately noticeable distinction. The results of the test are reported in Table 2 hereinbelow.

TABLE 2

| Example | Relative Hand Value (5 = best) |
|---|---|
| 1 | 1 |
| 2 | 2 |
| 3 | 3 |
| 4 | 4 |
| 5 | 5 |
| Control | 0 |
| 6 | 1 |
| 7 | 2 |
| 8 | 3 |
| 9 | 4 |
| 10 | 5 |
| Control | 0 |
| 11 | 1 |
| 12 | 2 |
| 13 | 3 |
| 14 | 4 |
| 15 | 5 |
| Control | 0 |

It is apparent from Table 2 that the emulsions of the present invention render fibers smooth and soft and are thus useful as fiber treatment agents.

The emulsions prepared above were then tested for percent settling, percent creaming and oil. Settling was determined by visual inspection of the sample, if a clear liquid separated out from the emulsion near the bottom of the sample, then the sample was determined to have some settling.

Creaming was determined by placing the sample in a centrifuge and running it at high speeds for a period of time. After centrifuging the sample, it was visually inspected to see if any separation had occurred in the middle of the centrifuge tube which would indicate creaming had occurred. There was no creaming in Examples 1–15 or in any of the controls.

The sample was also visually inspected for any loose oil floating on top of the centrifuge tube. There was no oil present in Examples 1–15 or in any of the controls. The percent settling of each sample is reported in Table 3 hereinbelow.

TABLE 3

| Example | Settling (%) |
|---------|--------------|
| 1       | 0            |
| 2       | 0            |
| 3       | 0            |
| 4       | Trace        |
| 5       | 1            |
| Control | 0            |
| 6       | 4.5          |
| 7       | 6.3          |
| 8       | 6.7          |
| 9       | 6.6          |
| 10      | 1.2          |
| Control | 2            |
| 11      | 0            |
| 12      | 0            |
| 13      | 0            |
| 14      | 0.6          |
| 15      | 6.6          |
| Control | 0            |

It is apparent from Table 3 that the emulsions of the present invention are resistant to settling and creaming and contain no free oil, That which is claimed is:

1. A silicone emulsion comprising:

(I) an ammonium siloxane composition comprising:
 (A) 0.01 to 90 weight percent of an aminosiloxane blend comprising a mixture of
  (i) an aminofunctional siloxane having its formula selected from the group consisting of:
   (a) $R_3SiO(Me_2SiO)_x(RR^1SiO)_y(RR^2SiO)_zSiR_3$ and
   (b) $R_3SiO(Me_2SiO)_x(RR^1SiO)_ySiR_3$; and
  (ii) an aminofunctional siloxane having its formula selected from the group consisting of:
   (a) $R_3SiO(Me_2SiO)_x(RR^1SiO)_y(RR^2SiO)_zSiR_2OH$ and
   (b) $R_3SiO(Me_2SiO)_x(RR^1SiO)_ySiR_2OH$; and
  (iii) an aminofunctional siloxane having its formula selected from the group consisting of:
   (a) $HOR_2SiO(Me_2SiO)_x(RR^1SiO)_y(RR^2SiO)_zSiR_2OH$ and
   (b) $HOR_2SiO(Me_2SiO)_x(RR^1SiO)_ySiR_2OH$;
 (B) 0.1 to 90 weight percent of a cyclic aminofunctional siloxane having the average formula:

(i) $\overline{(Me_2SiO)_{x'}(RR^1SiO)_{y'}}$ ; and (C) 0.1 to 10 weight percent of a compound having the average formula:

(i) $\overline{(Me_2SiO)_n}$ wherein Me denotes methyl, R is independently a monovalent hydrocarbon radical having from 1 to 6 carbon atoms or an aryl radical, $R^1$ is a group having its formula selected from the group consisting of

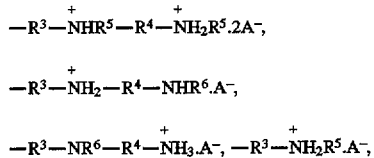

and wherein $R^3$ is a divalent hydrocarbon radical having at least 3 carbon atoms, $R^4$ is a divalent hydrocarbon radical having at least 2 carbon atoms, $R^5$ is selected from the group consisting of hydrogen, an alkyl radical having from 1 to 6 carbon atoms, an aryl radical, and an arylalkyl radical, $R^6$ is a —C(O)$R^7$ group where $R^7$ is selected from the group consisting of a monovalent hydrocarbon group having from 1 to 20 carbon atoms and an aryl radical, and $A^-$ is an anion selected from the group consisting of halide anions, carboxylate anions, and inorganic oxoanions, $R^2$ is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1; and (II) an organopolysiloxane emulsion.

2. An emulsion according to claim 1, wherein R is methyl or phenyl.

3. An emulsion according to claim 1, wherein $R^2$ is independently selected from the group consisting of ethyl, propyl, butyl, hexyl, phenyl, tolyl, and xylyl.

4. An emulsion according to claim 1, wherein $R^3$ is selected from the group consisting of propylene, butylene, pentylene, trimethylene, 2-methyltrimethylene, pentamethylene, hexamethylene, 3-ethyl-hexamethylene, and octamethylene.

5. An emulsion according to claim 1, wherein $R^4$ is selected from the group consisting of ethylene, propylene, butylene, pentylene, trimethylene, 2-methyltrimethylene, pentamethylene, hexamethylene, 3-ethyl-hexamethylene, and octamethylene.

6. An emulsion according to claim 1, wherein $R^5$ is selected from the group consisting of hydrogen, methyl, phenyl, —COCH$_3$, and —CH$_2$C$_6$H$_5$.

7. An emulsion according to claim 1, wherein $A^-$ is selected from the group consisting of CH$_3$COO$^-$, Cl$^-$, HOCH$_2$COO$^-$, C$_6$H$_5$COO$^-$, and HOC$_6$H$_4$COO$^-$.

8. An emulsion according to claim 1, wherein (A)(i) is an aminofunctional siloxane having the formula Me$_3$SiO(Me$_2$SiO)$_x$(MeR$^1$SiO)$_y$SiMe$_3$, (A)(ii) is an aminofunctional siloxane having the formula Me$_3$SiO(Me$_2$SiO)$_x$(MeR$^1$SiO)$_y$SiMe$_2$OH, (A)(iii) is an aminofunctional siloxane having the formula HOMe$_2$SiO(Me$_2$SiO)$_x$(MeR$^1$SiO)$_y$SiMe$_2$OH, and (B) is a cyclic aminofunctional siloxane having the formula:

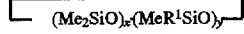

wherein $R^1$ is a group having its formula selected from the group consisting of:

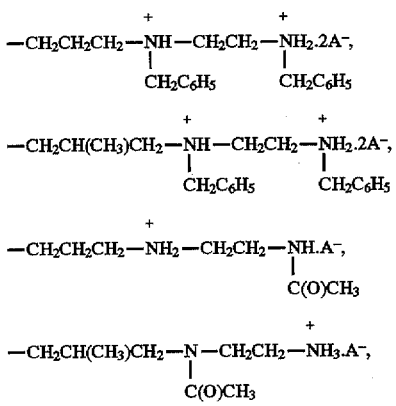

wherein A⁻ is selected from the group consisting of CH₃COO⁻, Cl⁻, HOCH₂COO⁻, C₆H₅COO⁻, and HOC₆H₄COO⁻ wherein x, y, x', and y' are as defined above.

9. An emulsion according to claim 8, wherein x has a value of 10 to 100, y has a value of 5 to 50, x' has a value of 2 to 3.5, and y' has a value of 0.5 to 2 with the proviso that the value of x'+y' is from 4 to 9.

10. An emulsion according to claim 1, wherein x has a value of 10 to 100, y has a value of 5 to 50, x' has a value of 2 to 3.5, and y' has a value of 0.5 to 2 with the proviso that the value of x'+y' is from 4 to 9.

11. An emulsion according to claim 1, wherein the organopolysiloxane emulsion comprises:
  (D) an organopolysiloxane polymer;
  (E) at least one surfactant; and
  (F) water.

12. An emulsion according to claim 11, wherein (D) is a compound having the formula Me₃SiO(Me₂SiO)ₐSiMe₃ wherein a has a value such that the viscosity of the organopolysiloxane polymer is from 100 to 1000 mm²/s.

13. An emulsion according to claim 11, wherein (E) is selected from the group consisting of anionic surfactants, cationic surfactants, nonionic surfactants, amphoteric surfactants, a mixture of nonionic surfactants, a mixture of nonionic surfactants and anionic surfactants, and a mixture of nonionic surfactants and cationic surfactants.

14. An emulsion according to claim 13, wherein the anionic surfactant is selected from the group consisting of alkali metal sulforicinates, sulfonated glyceryl esters of fatty acids, salts of sulfonated monovalent alcohol esters, amides of amino sulfonic acids, sulfonated products of fatty acids nitriles, sulfonated aromatic hydrocarbons, condensation products of naphthalene sulfonic acids with formaldehyde, sodium octahydroanthracene sulfonate, alkali metal alkyl sulfates, alkyl ether sulfates having at least 8 carbon atoms, alkyl aryl ether sulfates, alkylarylsulfonates having at least 8 carbon atoms, alkylbenzenesulfonic acids, salts of alkylbenzenesulfonic acids, sulfuric esters of polyoxyethylene alkyl ether, and amine salts or sodium salts or potassium salts of alkylnaphthylsulfonic acid.

15. An emulsion according to claim 13, wherein the cationic surfactant is selected from the group consisting dodecylamine acetate, octadecylamine acetate, acetates of the amines of tallow fatty acids, homologues of aromatic amines having fatty acids, fatty amides derived from aliphatic diamines, fatty amides derived from aliphatic diamines, fatty amides derived from disubstituted amines, derivatives of ethylene diamine, quaternary ammonium compounds, salts of quaternary ammonium compounds, alkyltrimethylammonium hydroxides, dialkyldimethylammonium hydroxides, coconut oil, methylpolyoxyethylene cocoammonium chloride, dipalmityl hydroxyethylammonium methosulfate, amide derivatives of amino alcohols, and amine salts of long chain fatty acids.

16. An emulsion according to claim 13, wherein the nonionic surfactant is selected from the group consisting of polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, and polyoxyalkylene glycol modified polysiloxanes.

17. A method of making a silicone emulsion comprising the steps of:
(1) mixing
  (I) a blend comprising:
    (A) 0.01 to 90 weight percent of an aminosiloxane solution comprising a mixture of:
      (i) an aminofunctional siloxane having its formula selected from the group consisting of:
        (a) $R_3SiO(Me_2SiO)_x(RR^1SiO)_y(RR^2SiO)_zSiR_3$ and
        (b) $R_3SiO(Me_2SiO)_x(RR^1SiO)_ySiR_3$; and
      (ii) an aminofunctional siloxane having its formula selected from the group consisting of:
        (a) $R_3SiO(Me_2SiO)_x(RR^1SiO)_y(RR^2SiO)_zSiR_2OH$ and
        (b) $R_3SiO(Me_2SiO)_x(RR^1SiO)_ySiR_2OH$; and
      (iii) an aminofunctional siloxane having its formula selected from the group consisting of:
        (a) $HOR_2SiO(Me_2SiO)_x(RR^1SiO)_y(RR^2SiO)_zSiR_2OH$ and
        (b) $HOR_2SiO(Me_2SiO)_x(RR^1SiO)_ySiR_2OH$;
    (B) 0.1 to 90 weight percent of a cyclic aminofunctional siloxane having the average formula:
      (i) $[(Me_2SiO)_{x'}(RR^1SiO)_{y'}]$; and
    (C) 0.1 to 10 weight percent of a compound having the average formula:
      (i) $[(Me_2SiO)_n]$ wherein Me denotes methyl, R is independently a monovalent hydrocarbon radical having from 1 to 6 carbon atoms or an aryl radical, $R^1$ is a group having its formula selected from the group consisting of —$R^3NH$—$R^4$—$NH_2$ and —$R^3$—$NH_2$ wherein $R^3$ is a divalent hydrocarbon radical having at least 3 carbon atoms, $R^4$ is a divalent hydrocarbon radical having at least 2 carbon atoms, $R^2$ is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1;
  (II) an acid compound; and
  (III) water to form a water soluble ammonium siloxane composition; and
(2) adding the water soluble ammonium siloxane composition of step (1) to an organopolysiloxane emulsion.

18. A method according to claim 17, wherein (A)(i) is an aminofunctional siloxane having the formula Me₃SiO(Me₂SiO)ₓ(MeR¹SiO)ᵧSiMe₃, (A)(ii) is an aminofunctional siloxane having the formula Me₃SiO(Me₂SiO)ₓ(MeR¹SiO)ᵧSiMe₂OH, (A)(iii) is an aminofunctional siloxane having the formula HOMe₂SiO(Me₂SiO)ₓ(MeR¹SiO)ᵧSiMe₂OH, and (B) is a cyclic aminofunctional siloxane having the formula:

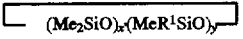

wherein R¹ is a group having its formula selected from the group consisting of —CH₂CH₂CH₂—NH—CH₂CH₂—NH₂, —CH₂CH(CH₃)CH₂—NH—CH₂CH₂—NH₂, and —CH₂CH₂CH₂—NH₂ wherein x, y, x', and y' are as defined above.

19. A method according to claim 17, wherein (II) is selected from the group consisting of CH₃COOH, HOCH₂COOH, C₆H₅COOH, HOC₆H₄COOH, and (CH₃CO)₂O.

20. A method according to claim 17, wherein the method further comprises adding an acid anhydride during step (1).

21. A method according to claim 20, wherein the acid anhydride is selected from the group consisting of acetic anhydride, benzoic anhydride, proprionic anhydride, butyric anhydride, hexanoic anhydride, decanoic anhydride, lauric anhydride, palmitic anhydride, and stearic anhydride.

22. A method according to claim 17, wherein the method further comprises adding an aryl halide during step (1).

23. A method according to claim 22, wherein the aryl halide is selected from the group consisting of benzyl chloride, benzyl bromide, benzyl iodide, benzyl fluoride, phenyl chloride, phenyl bromide, and phenyl fluoride.

24. A method of treating a substrate, the method comprising the step of:

(1) applying to a substrate a silicone emulsion wherein the silicone emulsion comprises:

(I) an ammonium siloxane composition comprising:
  (A) 0.01 to 90 weight percent of an aminosiloxane blend comprising a mixture of
    (i) an aminofunctional siloxane having its formula selected from the group consisting of:
      (a) R₃SiO(Me₂SiO)ₓ(RR¹SiO)ᵧ(RR²SiO)_zSiR₃ and
      (b) R₃SiO(Me₂SiO)ₓ(RR¹SiO)ᵧSiR₃; and
    (ii) an aminofunctional siloxane having its formula selected from the group consisting of:
      (a) R₃SiO(Me₂SiO)ₓ(RR¹SiO)ᵧ(RR²SiO)_zSiR₂OH and
      (b) R₃SiO(Me₂SiO)ₓ(RR¹SiO)ᵧSiR₂OH; and
    (iii) an aminofunctional siloxane having its formula selected from the group consisting of:
      (a) HOR₂SiO(Me₂SiO)ₓ(RR¹SiO)ᵧ(RR²SiO)_zSiR₂OH and
      (b) HOR₂SiO(Me₂SiO)ₓ(RR¹SiO)ᵧSiR₂OH;
  (B) 0.1 to 90 weight percent of a cyclic aminofunctional siloxane having the average formula:

(i) 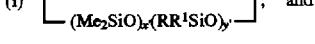 ; and (C) 0.1 to 10 weight percent of a compound having the average formula:

(i) 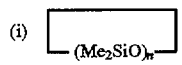

wherein Me denotes methyl, R is independently a monovalent hydrocarbon radical having from 1 to 6 carbon atoms or an aryl radical, R¹ is a group having its formula selected from the group consisting of

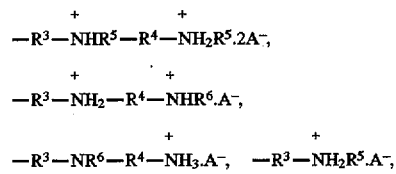

and wherein R³ is a divalent hydrocarbon radical having at least 3 carbon atoms, R⁴ is a divalent hydrocarbon radical having at least 2 carbon atoms, R⁵ is selected from the group consisting of hydrogen, an alkyl radical having from 1 to 6 carbon atoms, an aryl radical, and an arylalkyl radical, R⁶ is a —C(O)R⁷ group where R⁷ is selected from the group consisting of a monovalent hydrocarbon group having from 1 to 20 carbon atoms and an aryl radical, and A⁻ is an anion selected from the group consisting of halide anions, carboxylate anions, and inorganic oxoanions, R² is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1; and (II) an organopolysiloxane emulsion.

25. A method according to claim 24, wherein the method further comprises heating the substrate after step (1).

26. A method according to claim 24, wherein the substrate is selected from the group consisting of wool, cotton, nylon, polyester, acrylic fibers, polyester-cotton blends, leather, paper, gypsum board, and fiberfil.

27. A composition of matter obtained by mixing the incipient ingredients:

(I) an ammonium siloxane composition comprising:
  (A) 0.01 to 90 weight percent of an aminosiloxane blend comprising a mixture of
    (i) an aminofunctional siloxane having its formula selected from the group consisting of:
      (a) R₃SiO(Me₂SiO)ₓ(RR¹SiO)ᵧ(RR²SiO)_zSiR₃ and
      (b) R₃SiO(Me₂SiO)ₓ(RR¹SiO)ᵧSiR₃; and
    (ii) an aminofunctional siloxane having its formula selected from the group consisting of:
      (a) R₃SiO(Me₂SiO)ₓ(RR¹SiO)ᵧ(RR²SiO)_zSiR₂OH and
      (b) R₃SiO(Me₂SiO)ₓ(RR¹SiO)ᵧSiR₂OH; and
    (iii) an aminofunctional siloxane having its formula selected from the group consisting of:
      (a) HOR₂SiO(Me₂SiO)ₓ(RR¹SiO)ᵧ(RR²SiO)_zSiR₂OH and
      (b) HOR₂SiO(Me₂SiO)ₓ(RR¹SiO)ᵧSiR₂OH;
  (B) 0.1 to 90 weight percent of a cyclic aminofunctional siloxane having the average formula:

(i) 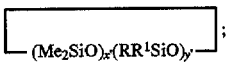 ; and (C) 0.1 to 10 weight percent of a compound having the average formula:

(i) 

wherein Me denotes methyl, R is independently a monovalent hydrocarbon radical having from 1 to 6 carbon atoms or an aryl radical, $R^1$ is a group having its formula selected from the group consisting of

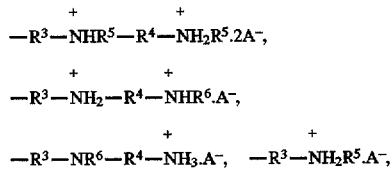

and wherein $R^3$ is a divalent hydrocarbon radical having at least 3 carbon atoms, $R^4$ is a divalent hydrocarbon radical having at least 2 carbon atoms, $R^5$ is selected from the group consisting of hydrogen, an alkyl radical having from 1 to 6 carbon atoms, an aryl radical, and an arylalkyl radical, $R^6$ is a $—C(O)R^7$ group where $R^7$ is selected from the group consisting of a monovalent hydrocarbon group having from 1 to 20 carbon atoms and an aryl radical, and $A^-$ is an anion selected from the group consisting of halide anions, carboxylate anions, and inorganic oxoanions, $R^2$ is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1; and (II) an organopolysiloxane emulsion.

* * * * *